United States Patent [19]

Kalverkamp

[11] Patent Number: 4,553,379
[45] Date of Patent: Nov. 19, 1985

[54] METHOD AND APPARATUS FOR HARVESTING OF CORN OR OTHER GRANULAR FRUITS

[76] Inventor: Klemens Kalverkamp, Warendorfer Str. 265, 4730 Ahlen/Westf., Fed. Rep. of Germany

[21] Appl. No.: 493,807

[22] Filed: May 12, 1983

[30] Foreign Application Priority Data

Apr. 10, 1982 [DE] Fed. Rep. of Germany ....... 3213542

[51] Int. Cl.⁴ .......................................... A01D 45/02
[52] U.S. Cl. ....................................... 56/60; 56/98; 56/106; 56/119
[58] Field of Search ............... 56/103, 104, 105, 106, 56/107, 108, 113, 114, 115, 116, 117, 118, 119, 98, 60; 130/5 R, 5 B, 5 E

[56] References Cited

U.S. PATENT DOCUMENTS

| | | | |
|---|---|---|---|
| 2,571,865 | 10/1951 | Greedy | 56/103 |
| 2,648,942 | 8/1953 | Grant et al. | 56/119 |
| 3,304,702 | 2/1967 | Russell | 56/104 |
| 3,331,196 | 7/1967 | Grant | 56/106 |
| 3,584,443 | 6/1971 | Bulin | 56/105 |
| 3,707,833 | 1/1973 | Sutton | 56/104 |
| 3,760,813 | 9/1973 | Mathews | 130/27 R |
| 3,831,356 | 8/1974 | Maiste et al. | 56/119 |
| 4,333,304 | 6/1982 | Greiner et al. | 56/119 |

Primary Examiner—Robert P. Swiatek
Assistant Examiner—David L. Tarnoff
Attorney, Agent, or Firm—Hill, Van Santen, Steadman & Simpson

[57] ABSTRACT

A method and an apparatus are disclosed for the harvesting of corn or other granular fruits, particularly embodied as a front-mounted unit for a reaper, in which the plant stems are drawn through a picking aperture and a separation of the fruit from the plant is characterized in that the plant is grasped only on one side and is drawn through the picking aperture.

13 Claims, 4 Drawing Figures

METHOD AND APPARATUS FOR HARVESTING OF CORN OR OTHER GRANULAR FRUITS

BACKGROUND OF THE INVENTION

1. Field of the Invention:

The present invention relates to a method and to an apparatus for harvesting, and is particularly concerned with the harvesting of corn or other granular fruits, particularly with a front-mounted apparatus for a reaper by which a stripping of plant stalks through a picking aperture and separation of the corn or other fruits from the plant takes place.

2. Description of the Prior Art

From the German published application No. 1,757,213, a corn harvesting apparatus is known, in which a pair of charging rollers draws the corn plant through a picking aperture which is arranged centrally above the pair of charging rollers. With this structure, the ears of corn, which cannot pass through the picking aperture, are plucked and may be taken up by a conveyor. With a harvesting apparatus of this type, it is a disadvantage that frequently the upper portion of the corn plant tears off during the charging process. Therefore, the upper portion of the corn plant enters into the series-connected aggregates of the reaper. In addition, the known corn harvesting apparatus is heavy and appreciably burdens the front axle of the harvesting vehicle to which it is fastened. Furthermore, it is expensive and the quality of the harvested fruits is impaired by squeezing on the lower side.

SUMMARY OF THE INVENTION

It is the object of the present invention to provide the corn harvesting apparatus in which a tearing off of the corn plant in the charging operation is prevented, the quality of the harvested fruit is improved, harvesting can be carried out substantially more easily than previously, and that, at need, a comminution of the corn plants can be undertaken simultaneously with the harvesting operation. A separate comminution device, as in the German published application No. 2,005,352 is, accordingly, no longer necessary.

In addition, the invention can be constructed in a cost-saving manner to provide apparatus which is easy to service and to clean, and with which skills acquired, for example, in countries of the Third World suffice for carrying out repairs.

The main object is achieved, according to the present invention, in that the plant is grasped only on one side and is drawn through a picking aperture. Through a grasping of the plant only on one side for the drawing process, there results a surprisingly operating and particularly simple and light construction, which is far superior as to operation and cost with respect to previous harvesters which operate with pairs of rollers.

The number of necessary charging rollers and the drive apparatus therefore is advantageously cut in half.

According to a particular feature of the invention, it is provided that the separation of the ear of corn and plant essentially takes place through breaking of the stem or stalk of the ear. Through a breaking of the stem, advantageously a separation of the plant and fruit is attained by substantially less forces than upon tearing off of the ear of corn. In addition, the underside of the ear remains undistorted. A tearing off of the plant, even with already bent over plants or plants lying on the ground, no longer occurs.

According to a further object of the invention, it is provided that the breaking of the corn stalks takes place by way of a cracking around about a breaking edge. Through the utilization of a breaking edge, it is possible to provide a precision breaking of the stems. in any case, already damaged or weak corn stems which directly tear off, do not break on the breaking edge. Healthy and strong corn, which could lead to a tearing off of the plant, advantageously always break off.

According to a further object of the invention, it is provided that the charging operation also brings about a comminution of the plant. This results in the particularly advantageous possiblility, without additional working apparatus, of completely harvesting corn fields or the like, and recovering both the granular fruits, such as the ears of corn, as well as the plants, for example for cattle feed.

In accordance with a further object of the invention, it is provided that the comminution of the charged plant takes place in an inclined direction. An especially favorable method of operation thus results as the cutting forces are less than with a comminution in the transverse direction of the plant.

The utilization of a harvesting apparatus with single-sided charging of the plants in a picking aperture, upon the harvesting of corn or granular fruits were shown to be clearly superior according to method and production costs than the previously-known harvesting apparatus. It is a question of a completely new harvesting principle, which is not comparable with the method of operation of the known corn harvesting apparatus.

For carrying out the method, according to the invention, a harvesting apparatus for the harvesting of corn or other granular fruits is provided, which apparatus is constructed particularly as a front unit for a reaper and has a charging apparatus and a picking aperture for the separation of the ears of corn or other fruits from the plant. It is characterized in that it has, per each row of plants, a charging roller with a partial casing. By way of the partial casing, it is surprisingly possible to dispense with a second charging roller, as was previously regarded as necessary, and to develop harvesting apparatus more easily and substantially more cost effective. The front axle and the entire vehicle to which the harvesting apparatus is fastened, is substantially facilitated.

In accordance with a further object of the invention, it is provided that the partial casing has preferably below, cutting knives for the comminution of the plant, which project into corresponding slots in vanes carried by the charging roller. A comminution of the plants therefore results in an advantageous and simultaneous operation with the harvesting operation. Not only the fruits, but also the plant itself, may therefore be recovered, for example for silage. The utilization of a separate cutting aggregate, however, becomes superfluous, so that also in this case the harvesting apparatus is appreciably smaller and lighter than can ordinarily be constructed.

In accordance with another object of the invention, it is provided that the partial casing has thereabove a breaking edge, particularly in the form of an iron rod carried by the partial casing and that opposite the breaking edge a guide plate is arranged. A picking aperture therefore results which serves both for guiding of the plant free from difficulty, during the picking operation, and also for a breaking of the stem of an ear of corn, also free from difficulty. Through the utilization of an iron rod, there results a high durability of the breaking edge and through the guide plate and adjustment, also free from difficulty, is possible, for example, to especially thin or especially thick plants. Under all circumstances, it can be attained that a harvesting operation is possible, free from difficulty, and that the harvesting result with respect to the output lies beyond that heretofore known.

In accordance with a further object of the invention, it is provided that the partial casing has at its lower end an adjusting screw for the adjustment of the aperture between the charging roller and the partial casing. With this structure, an adaptation to the particular relations is possible, for example whether dry plants or very moist plants are to be harvested. Furthermore, it is advantageously possible to equalize the wear which occurs.

In accordance with a further object of the invention, it is provided that the harvesting apparatus has a collective drive arranged especially under a corn ear feeding worm, with a conveyor worm for comminuted plant parts. An advantageous separation of the individual transporting paths for the fruits and the plant therefore results, which permits optimally developing the transporting paths both for the fruits and for the plant. The harvesting apparatus has in this embodiment an angle of approximately 20° with respect to ground. This angle is indeed greater than the angle checked at 15° in another embodiment of the invention. It was shown, however, that the disadvantageous effect of the greater inclination for the harvesting result is outweighed by the advantages of the collective drive.

In accordance with the further object of the invention, it is provided that the harvesting apparatus has pick-up rotors, particularly of synthetic material (or plastic) for the picking-up or collecting of the corn lying on the ground. Such rotors advantageously take up the corn lying on the ground and lift it up to such an extent that it can be drawn in by the charging roller into the picking aperture. A further stripping then takes place during simultaneous further lifting of the plant. This solves the previously unsolved problem of the harvesting of corn lying on the ground, for example, when the latter has become too moist or was broken down by inclement weather, such as by a hail storm. It is only necessary for this particular case to equip the harvesting apparatus with the corresponding rotors. This can take place easily and simply through a slipping-on of the pick-up rotors and their mounting.

In accordance with a further object of the invention, it is provided that the pick-up chain cooperates with the feed rotor. By way of a drive through the feed chain, there results an advantageously simple type of drive for the pick-up rotor.

In accordance with a further object of the invention, it is provided that the charging rollers are arranged standing, along with the particular picking apertures. Surprisingly, operating the harvester with upstanding charging rollers is of particular advantage for harvesting sunflowers.

In accordance with a further object of the invention, it is provided that the charging rollers have helically constructed charging passages. With such a structure, the advantageous result is attained that the occurrence of torque peaks can be prevented. An intermittent strain on the driving elements, etc., disappears, so that the latter may be constructed lighter. In addition, a more uniform operation results without vibrations.

According to a further object of the invention, it is provided that the harvesting apparatus is constructed in a modular manner, whereby the module width is adjustable by way intermediary parts to the row spacing of the plants. A universal adjustability therefore results.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
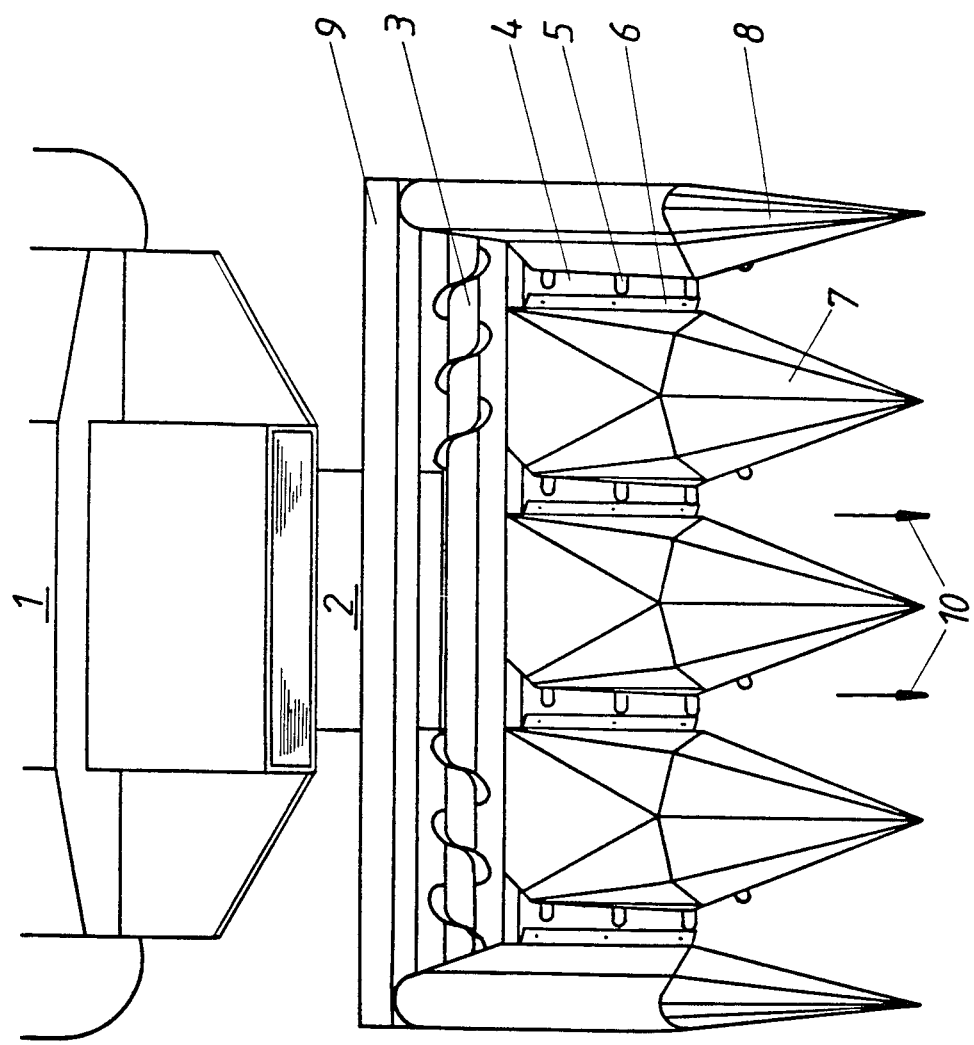
FIG. 1 is a top plan view of a harvesting apparatus having longitudinally-disposed picking apertures and mounted in front of a harvesting vehicle.

Referring to FIG. 1, a harvesting vehicle 1, for example a reaper, has a front end which supports harvesting apparatus 9. The connection between the vehicle 1 and the harvesting apparatus 9 is carried out by way of supports (not shown). The harvested material is conveyed through an inclined conveyor 2 into the harvesting vehicle 1. The material is supplied to the inclined conveyor 2 by way of a worm 3 which operates to feed the conveyor 2 from opposite directions (outboard to inboard). The harvesting apparatus 9 comprises outer dividers 8 and inner dividers 7 which are guided through between the rows of, for example, corn. The plants enter into a picking aperture 4 and are drawn in by the picking rollers (see FIG. 3). A feed chain 5 for the plants runs opposite the other side 6 of the picking aperture 4. The direction of travel is indicated by the two motion arrows 10. As is apparent, the inner and outer dividers 7 and 8 are relatively long and have both tip and middle sections.

Figure 2:
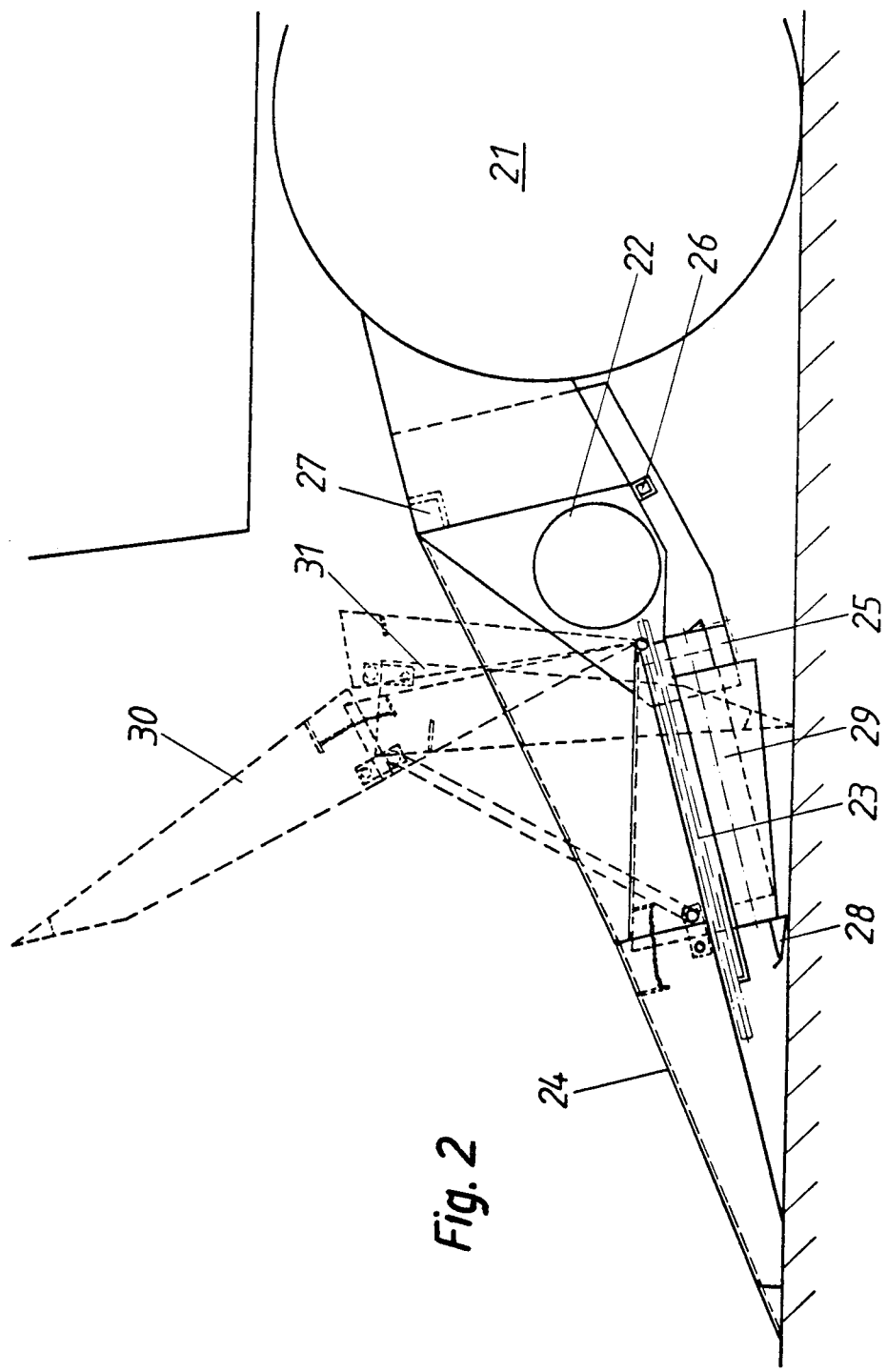
FIG. 2 is a side elevation of a harvesting apparatus having longitudinally disposed picking apertures, in which the repair and transporting position is indicated.

In FIG. 2, a front axle 21 is illustrated which is fastened by way of carriers 25, 26 and 27 to the harvesting apparatus. For the transportation of the harvested fruits, a worm 22 is provided and the fruits are stripped off with the picking roller 29 as they reach the picking aperture 23.

The tip 24 7 in FIG. 1 is advantageously adjustable as to height for mounting and repair work in the position 30 and is collapsible for transportation purposes to the position 31 (both positions shown in phantom).

For guidance on the ground, a shoe 28 is provided and is rigidly connected with the front bearing of the picking roller 29 and the frame for the feed chain.

Figure 3:
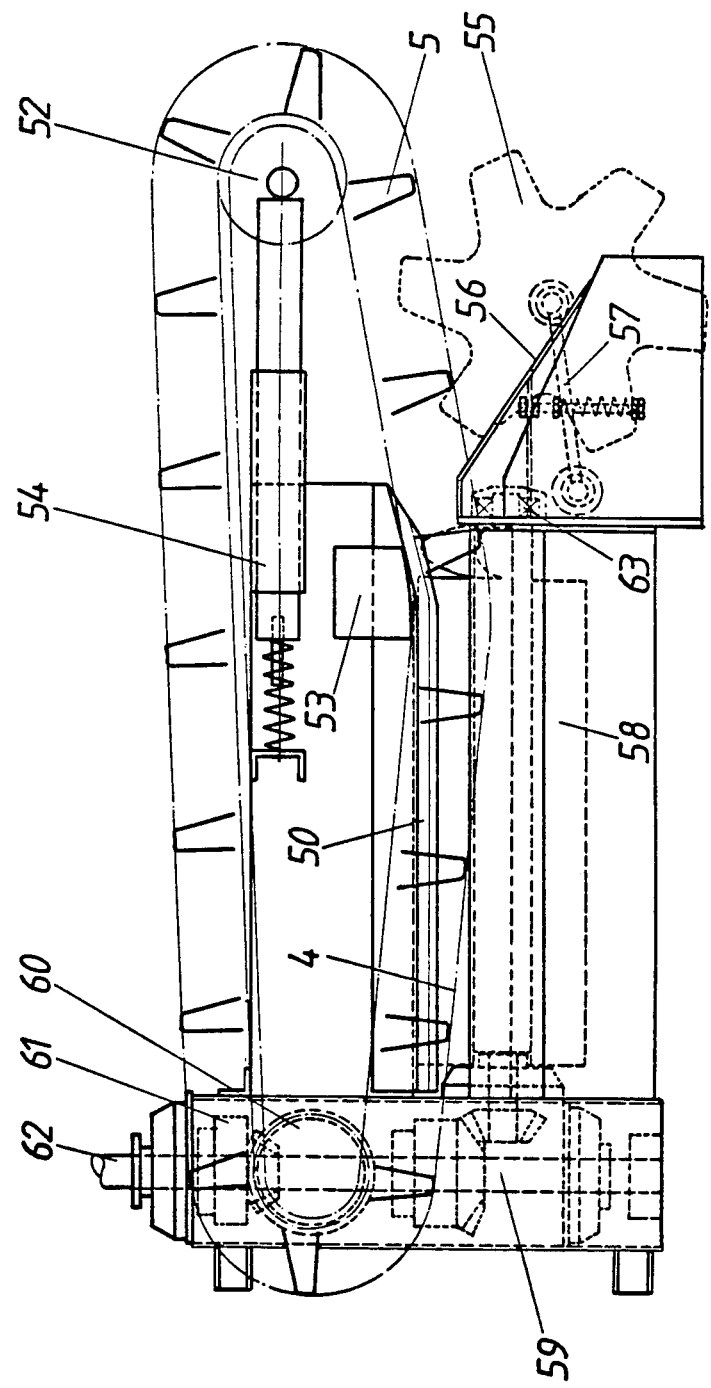
FIG. 3 illustrates another harvesting apparatus having a longitudinally-disposed picking aperture and a feed rotor.

Referring to FIG. 3, a picking edge 50 is illustrated in the form of an iron rod above the partial casing. The feed chain 5 is located above a picking aperture 4 and travels over the chain wheel 52 and, tensioned by way of a chain guide block 51, is guided inclined to the picking aperture 4. The tension of the drive chain takes place by way of a spring-loaded tension device 54.

For the take-up of the corn lying on the ground, so-called storage corn, a feed rotor 55, preferably of plastic material, is provided, the feed rotor being selectively disposed and pressed through with a pivot arm 57 which is mounted on the guide tip 56. For the drive of the picking roller 58, a bevel gear structure 59 (illustrated in broken lines) is driven by a chain wheel 60. The drive of the charging roller 58 and the feed chain 5 takes place by way of slip clutches 61 which prevent damage which could result upon the introduction of a foreign body, for example a stone. Therefore, the resulting system is reliable in operation and may be introduced on hard ground and stony acreage.

Figure 4:
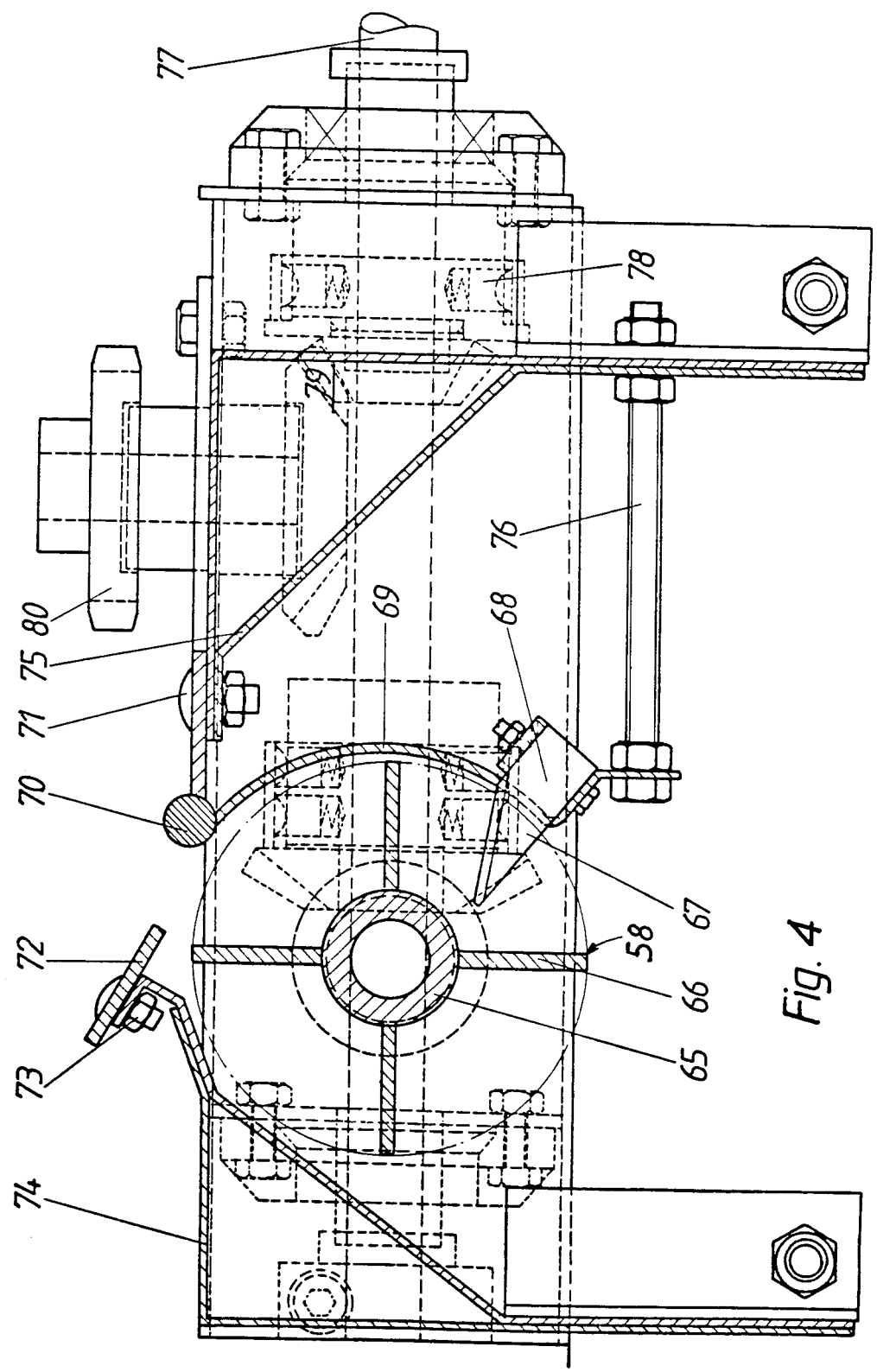
FIG. 4 is a sectional view through a charging roller having a partial casing and having, diagrammatically illustrated, a drive.

Referring to FIG. 4, a hollow shaft 65 of the charging roller is provided with a plurality of vanes 66. The vanes 66 are advantageously welded onto the hollow shaft 65 so that a very favorable cost-saving embodiment results. The vanes 66 have, where necessary, slots which extend in the plane of the drawing and in which comminution knives 67 are received, the knives 67 being fixed by way of fasteners 68 to the partial casing 69. The resulting structure provides the possibility of comminuting the harvested plants easily and simply and in a more favorable manner than previously attained, in order, for example, to guide the same to a silo or in order to facilitate later plowing.

The partial casing 69 carries, at its upper end, a picking edge 70, preferably in the form of an iron rod. The adjustment of the partial casing 69 takes place by way of screws 71 which engage in longitudinal apertures, and through lower adjusting screws 76. Therefore, it is possible to regulate an optimal aperture between the vanes 66 and the partial casing 69. Dry corn, as well as moist corn, can be harvested in a optimum manner. Above the picking roller is located a fixed guide plate 72 which likewise is adjustable by way of elongate apertures and screws 73.

Therefore, the picking aperture can also be shifted with respect to width without further manipulations. The guide plate 72 is arranged on a carrier 74 which preferably is constructed as a triangular carrier. The picking edge 70 is connected with the carrier 75 by way of the screw couplings 71. The carrier 75 is likewise preferably constructed as a triangular carrier. The drive of the picking roller takes place through a drive shaft 77, by which through a bevel gear structure 79, the chain drive wheel 80 for the feed chain 5 is driven, and between the drive shaft 77 and the picking roller and the chain drive wheel 80 is a slip clutch 78.

The harvesting apparatus, according to the invention, is intended particularly for the harvesting of corn. It may just as well be utilized, however, for the harvesting of other granular fruits, for example, sunflowers. It offers, compared with conventional apparatus, an appreciable saving in weight and expense for drive apparatus and the like. Furthermore, it offers the advantage of a protective picking procedure. It is both, adapted as a front-mounting unit for a reaper, for example, as well as a front portion of a special harvesting apparatus. The advantages, according to the invention, remain obtained in all cases.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:
1. A method of harvesting granular fruits which are connected by stems to plant stalks and which grow in spaced rows in a field, comprising the steps of:
   moving through the field while contemporaneously guiding each row of plants in a vertical orientation towards a respective fixed picking aperture;
   grasping each plant of each row on only one side thereof as it enters the respective picking aperture; and
   drawing each plant downwardly and pinching the same against the edge of the respective picking aperture to pluck and separate the fruit from the stalk at the stem.

2. The method of claim 1, and further comprising the step of:
   comminuting the stalk of the plant.

3. The method of claim 1, and further comprising the step of:
   picking up a bent over plant before guiding the same towards the picking aperture.

4. Harvesting apparatus for harvesting granular fruits carried by stems on the stalks of plants, comprising:
   a frame adapted to move over the ground towards a plant;
   aperture means carried by said frame defining a picking aperture, including a rotatable picking roller for grasping one side of the plant and a picking edge for plucking the fruit by separating its stem;
   guide means carried by said frame for guiding the plant toward said aperture means;
   a casing mounted and shaped to extend partially about said picking roller and carrying said picking edge;
   a plurality of knives carried spaced apart on said frame; and
   a plurality of vanes on said picking roller for engaging and drawing the stalks as the roller rotates, each of said vanes including spaced slots for receiving said knives and comminuting the stalks as the roller rotates.

5. Harvesting apparatus for harvesting granular fruits carried by stems on the stalks of plants, comprising:
   a frame adapted to move over the ground towards a plant;
   aperture means carried by said frame and defining a picking aperture extending in the direction of movement and oblique to the ground, said picking aprture including a rotatable picking roller and a picking edge spaced from said picking roller;
   guide means carried by said frame for guiding the plant toward said aperture means; and
   a casing mounted on said frame and shaped to extend partially about said picking roller and carrying said picking edge,
   said picking roller including a rotatable shaft and a plurality of vanes extending from said shaft to grasp one side of the plant and draw the plant through the picking aperture against the picking edge and casing to pluck the fruit with said picking edge by separating the fruit from the stalk.

6. The harvesting apparatus of claim 5, and further comprising:
   a plurality of said aperture means, side means and said casings mounted side-by-side for harvesting a plurality of rows of plants.

7. The harvesting apparatus of claim 5, and further comprising:

a plurality of knives carried spaced apart on said frame;

and wherein each of said vanes comprises a plurality of spaced slots for receiving said knives and comminuting the stalks as the roller rotates.

8. The harvesting apparatus of claim 5, and further comprising:

a rod carried by said casing as a breaking member and constituting said picking edge.

9. The harvesting apparatus of claim 5, wherein:

said casing comprises a first edge carrying said picking edge, and a second edge; and mounting means adjustably mounting said first and second edges for adjusting said casing with respect to said roller to adjust said picking aperture.

10. The harvesting apparatus of claim 9, wherein said mounting means comprises:

an adjustable mounting screw connecting said second edge to said frame; and means defining an aperture adjacent said first edge, means defining an elongate slot in said frame, and a bolt extending through the aperture and the slot.

11. The harvesting apparatus of claim 5, and further comprising:

a first conveyor for receiving and carrying of the harvested fruit;

cutting means cooperable with said picking roller to comminute the stalks; and a second conveyor below said picking roller for receiving and carrying off the comminuted stalks.

12. The harvesting apparatus of claim 5, and further comprising:

a feed rotor mounted on said frame for rotation near the ground to pick up bent over plants for harvesting.

13. The harvesting apparatus of claim 12, wherein:

said feed rotor comprises plasic material.

* * * * *